United States Patent
Van Vliet

(10) Patent No.: US 10,486,702 B2
(45) Date of Patent: Nov. 26, 2019

(54) TRACTION CONTROL METHOD AND DEVICE FOR A VEHICLE

(71) Applicant: Dr. Ing. h.c. F. Porsche Aktiengesellschaft, Stuttgart (DE)

(72) Inventor: Peter Van Vliet, Eberdingen (DE)

(73) Assignee: Dr. Ing, h.c. F. Porsche Aktiengesellschaft (DE)

( * ) Notice: Subject to any disclaimer, the term of this patent is extended or adjusted under 35 U.S.C. 154(b) by 122 days.

(21) Appl. No.: 15/811,932

(22) Filed: Nov. 14, 2017

(65) Prior Publication Data

US 2018/0141559 A1 May 24, 2018

(30) Foreign Application Priority Data

Nov. 18, 2016 (DE) .................. 10 2016 122 245

(51) Int. Cl.
*B60K 28/16* (2006.01)
*B60W 30/18* (2012.01)

(52) U.S. Cl.
CPC ....... *B60W 30/18172* (2013.01); *B60K 28/16* (2013.01); *B60W 2520/26* (2013.01); *B60W 2710/0666* (2013.01)

(58) Field of Classification Search
CPC ....... B60W 30/18172; B60W 2520/26; B60W 2710/0666; B60K 28/16
See application file for complete search history.

(56) References Cited

U.S. PATENT DOCUMENTS

| | | | |
|---|---|---|---|
| 4,818,037 A | 4/1989 | McEnnan | |
| 7,340,368 B2 | 3/2008 | Fiedler et al. | |
| 7,529,611 B2 * | 5/2009 | Tseng | B60K 28/16 180/197 |
| 8,635,002 B2 * | 1/2014 | Brenner | B60K 23/0808 180/197 |
| 8,694,223 B2 | 4/2014 | Tseng et al. | |
| 2005/0182548 A1 | 8/2005 | Bernzen et al. | |
| 2007/0078593 A1 * | 4/2007 | Fiedler | B60G 17/019 701/124 |
| 2007/0275823 A1 * | 11/2007 | Motosugi | B60K 6/48 477/176 |
| 2015/0112508 A1 * | 4/2015 | Kato | B60L 15/20 701/1 |

(Continued)

FOREIGN PATENT DOCUMENTS

DE 68908007 T2 12/1993
DE 10358335 B3 5/2005

(Continued)

OTHER PUBLICATIONS

German Search Report for German Application No. 10 2016 122 245.3, dated Jul. 27, 2017, with partial English translation—7 Pages.

*Primary Examiner* — Kevin Hurley
*Assistant Examiner* — Marlon A Arce
(74) *Attorney, Agent, or Firm* — RatnerPrestia

(57) ABSTRACT

A traction control method and device for a vehicle is disclosed. In the method, an actual slip of a wheel of the vehicle is made available, a filtered actual slip is determined adaptively from the actual slip by an adaptive filter, the filtered actual slip is passed on to a controller, and the engine torque is set by the controller as a function of the filtered actual slip and of a target slip.

6 Claims, 1 Drawing Sheet

(56) References Cited

U.S. PATENT DOCUMENTS

2015/0298577 A1* 10/2015 Kobayashi ............. B60L 15/20
701/22

FOREIGN PATENT DOCUMENTS

| DE | 102006026716 A1 | 1/2007 |
|---|---|---|
| WO | 03076243 A1 | 9/2003 |
| WO | 2004067307 A1 | 8/2004 |

* cited by examiner

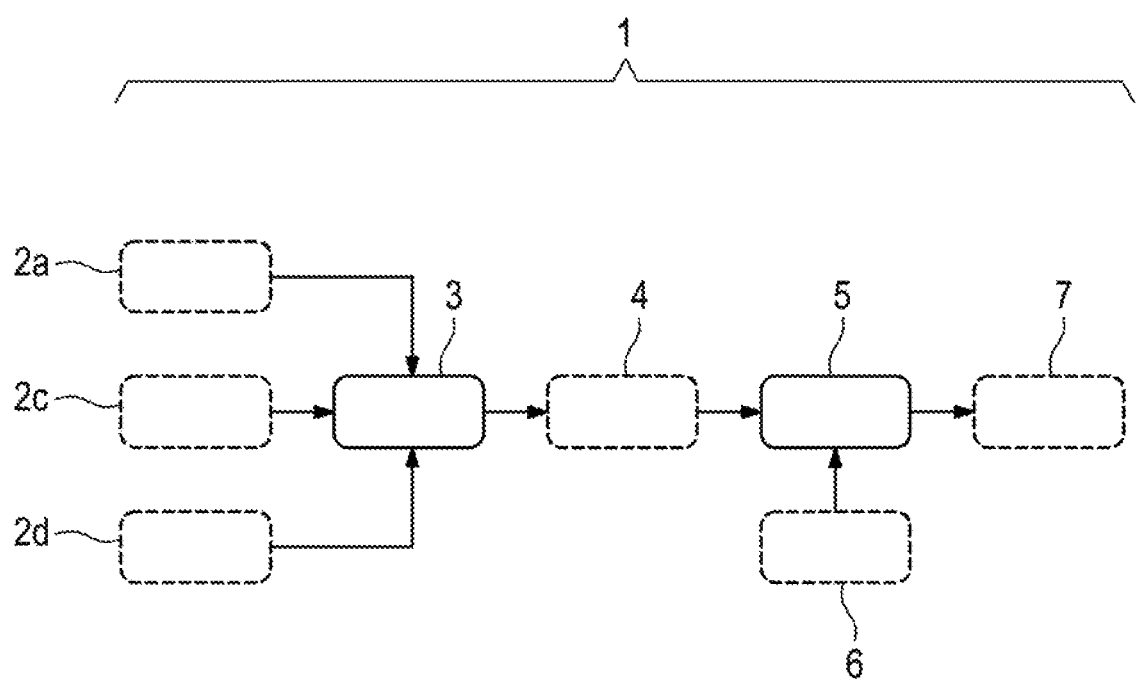

TRACTION CONTROL METHOD AND DEVICE FOR A VEHICLE

CROSS-REFERENCE TO RELATED APPLICATIONS

This application claims priority to German Patent Application No. 10 2016 122 245.3, filed Nov. 18, 2016, which is incorporated by reference herein in its entirety.

FIELD OF THE INVENTION

The present invention relates to a traction control method for vehicles, wherein the engine torque of at least one wheel of the vehicle is set by means of a controller, wherein the engine torque is set as a function of a target slip and a filtered actual slip, wherein the filtered actual slip is made available by a filter, wherein the filter determines the filtered actual slip at least from an actual slip which is made available.

BACKGROUND OF THE INVENTION

Traction control systems and traction control methods are known from the prior art. When wheel slip is present, either the brake system or the engine power is correspondingly adapted. For this purpose, in the prior art a filtered slip was made available from a calculated actual slip by means of a filter, and the engine torque or the braking capacity were correspondingly regulated by comparison with a target slip at a controller. In particular, in the case of wheel load fluctuations, the filtering of the slip prevents strong oscillations in the engine torque and therefore losses in performance. However, on level asphalt the filtering of the slip gives rise to a phase offset in the regulating circuit and therefore to performance losses.

SUMMARY OF THE INVENTION

Described herein is a traction control method which prevents performance losses on level asphalt without having to accept compromises in the case of strong wheel load fluctuations.

In the traction control method for a vehicle, an actual slip of a wheel of the vehicle is made available, wherein a filtered actual slip is determined adaptively at least from the actual slip by means of an adaptive filter, wherein the actual slip is passed on to a controller, wherein the engine torque is set by means of the controller as a function of the filtered actual slip and of a target slip.

Wheel slip in the sense of the present invention denotes the slip which is present at a wheel of the vehicle. The slip of a wheel is the ratio of the rotational speed of the driven wheel of the vehicle to the rotational speed of a hypothetical wheel which is not driven and is entrained in a positively locking fashion. In particular, a wheel slip which is different from zero occurs if drive forces or braking forces are transmitted to the wheel. In the case of a strong wheel slip of at least one wheel of the vehicle, uncontrolled spinning of the wheel of the vehicle occurs and/or the wheel of the vehicle locks. In particular, the uncontrolled spinning of at least a rear drive wheel of the vehicle can cause the vehicle to swerve. In particular, uncontrolled locking of at least one wheel of the vehicle can cause the vehicle to skid.

An actual slip of a wheel of the vehicle in the sense of the present invention denotes an actually present wheel slip of the wheel of the vehicle. In one preferred embodiment of the present invention, the actual slip is made available as a calculated actual slip.

In the sense of the present invention, a target slip of a wheel of the vehicle denotes the wheel slip which is ideally present at the wheel of the vehicle. In particular, the target slip predefines a maximum value for the wheel slip. In a further preferred embodiment of the present invention, the controller is a PID controller (proportional integral derivative controller).

In a further preferred embodiment of the present invention, the filtered actual slip is determined adaptively, that is to say in the sense of the present invention the filtered actual slip is determined from the actual slip as a function of at least one further variable.

In the sense of the present invention, an adaptive filter denotes a filter which can determine a filtered actual slip from the actual slip as a function of at least one further variable.

In this way it is advantageously possible to determine the filtered actual slip as a function of at least one further variable in addition to the slip which is made available. In particular, in this way performance losses as a result of filtering can be advantageously avoided.

In a further preferred embodiment of the present invention, a wheel load fluctuation is fed to the adaptive filter, and the filtered actual slip of at least one wheel of the vehicle is determined by means of the adaptive filter as a function of the wheel load fluctuation of the same wheel of the vehicle.

In the sense of the present invention, wheel load fluctuation of a wheel of the vehicle denotes a fluctuation in the force acting on the wheel of the vehicle, perpendicularly with respect to the underlying surface on which the wheel of the vehicle rests.

The adaptive filter determines the filtered actual slip from the actual slip and additionally at least from the wheel load fluctuation. In one preferred embodiment of the present invention, when wheel load fluctuation occurs the cutoff frequency of the filter is lowered.

In a further preferred embodiment of the present invention, a vertical acceleration is fed to the adaptive filter, in particular in order to determine the wheel load fluctuation, and the filtered actual slip of at least one wheel of the vehicle is determined by means of the adaptive filter as a function of the vertical acceleration of the same wheel of the vehicle.

In an alternative preferred embodiment of the present invention, the vertical acceleration is determined by means of a sensor cluster.

In a further preferred embodiment of the present invention, the wheel load fluctuation is derived from the vertical acceleration, and the filtered actual slip is determined as a function of the wheel load fluctuation.

In an alternative preferred embodiment of the present invention, the filtered actual slip is determined as a function of the vertical acceleration and as a function of the wheel load fluctuation.

In an alternative preferred embodiment of the present invention, the filtered actual slip is determined as a function of the vertical acceleration.

In a further preferred embodiment of the present invention, a roll rate is fed to the adaptive filter, in particular in order to determine the wheel load fluctuation, and the filtered actual slip of at least one wheel of the vehicle is determined by means of the adaptive filter at least as a function of the roll rate of the same wheel of the vehicle. In a further preferred embodiment of the present invention, the wheel load fluctuation is determined from the roll rate, and the filtered actual slip is determined as a function of the wheel load fluctuation.

In an alternative preferred embodiment of the present invention, the filtered actual slip is determined as a function of the roll rate.

In an alternative preferred embodiment of the present invention, the filtered actual slip is determined as a function of the wheel load fluctuation and as a function of the roll rate.

In a further preferred embodiment of the present invention, the wheel load fluctuation is determined from the vertical acceleration and from the roll rate, and the filtered actual slip is determined as a function of the wheel load fluctuation.

In a further preferred embodiment of the present invention, the filtered actual slip is determined as a function of the roll rate and as a function of the vertical acceleration.

In a further preferred embodiment of the present invention, the filtered actual slip is determined as a function of the roll rate, as a function of the vertical acceleration and as a function of the wheel load fluctuation.

A further subject matter of the present invention is a traction control system, in particular for a traction control method for vehicles according to the above description, wherein the traction control system has an adaptive filter, wherein the adaptive filter has an input for an actual slip, wherein the adaptive filter has an output for a filtered actual slip, wherein the traction control system additionally has a controller, wherein the controller has an input for the filtered actual slip, wherein the controller has an input for a target slip, wherein the controller has an output for regulating the engine torque.

In one preferred embodiment of the present invention, the controller is a PID controller. In a further preferred embodiment, the actual slip is made available in the form of a calculated actual slip.

In one preferred embodiment of the present invention, the adaptive filter has an input for the wheel load fluctuation of at least one wheel of the vehicle. In particular, the adaptive filter can have further inputs for further properties of at least one wheel of the vehicle. In particular, the adaptive filter can have more than one input for the wheel load fluctuation of at least one wheel of the vehicle.

In a preferred embodiment of the present invention, the adaptive filter has an input for the vertical acceleration of at least one wheel of the vehicle. In particular, the adaptive filter can have further inputs for further properties of at least one wheel of the vehicle. For example, the adaptive filter has an input for the vertical acceleration of at least one wheel of the vehicle and an input for the wheel load fluctuation of at least one wheel of the vehicle. In particular, the adaptive filter can have more than one input for the vertical acceleration of at least one wheel of the vehicle.

In a preferred embodiment of the present invention, the vertical acceleration is determined by means of a sensor cluster.

In a further preferred embodiment of the present invention, the adaptive filter has a unit by means of which the wheel load fluctuation of at least one wheel of the vehicle can be determined and/or estimated from the vertical acceleration of at least one wheel of the vehicle.

In a preferred embodiment of the present invention, the adaptive filter has an input for the roll rate of at least one wheel of the vehicle. In particular, the adaptive filter can have further inputs for further properties of at least one wheel of the vehicle. For example, the adaptive filter has an input for the roll rate of at least one wheel of the vehicle and an input for the wheel load fluctuation of at least one wheel of the vehicle.

For example, the adaptive filter has an input for the roll rate of at least one wheel of the vehicle and an input for the wheel load fluctuation of at least one wheel of the vehicle and an input for the vertical acceleration of at least one wheel of the vehicle.

For example, the adaptive filter has an input for the roll rate of at least one wheel of the vehicle and an input for the vertical acceleration of at least one wheel of the vehicle. In particular, the adaptive filter can have more than one input for the roll rate of at least one wheel of the vehicle.

In a further preferred embodiment of the present invention, the adaptive filter has a unit by means of which the wheel load fluctuation of at least one wheel of the vehicle can be determined and/or estimated from the roll rate of at least one wheel of the vehicle and/or from the vertical acceleration of at least one wheel of the vehicle.

BRIEF DESCRIPTION OF THE DRAWING

Further details, features and advantages of the invention emerge from the drawings and from the following description of preferred embodiments with reference to the drawings. The drawings illustrate here only exemplary embodiments of the invention which do not limit the inventive concept.

FIG. 1 is a schematic illustration of a traction control system and a traction control method for a vehicle by using an adaptive filter for adaptively determining a filtered actual slip to be passed on to a PID controller for setting an engine torque of at least one wheel of the vehicle in accordance with an exemplary embodiment of the present invention.

DETAILED DESCRIPTION OF THE INVENTION

In FIG. 1, the various steps of a traction control method are illustrated in accordance with an exemplary embodiment of the present invention. The method has a first step in which a calculated actual slip 2a, a vertical acceleration 2c and a roll rate 2d of a wheel of the vehicle are fed to an adaptive filter 3. The filter 3 determines a filtered actual slip 4 from the calculated actual slip 2a, the vertical acceleration 2c and the roll rate 2d. The filtered actual slip 4 is fed to a PID controller 5. Furthermore, a target slip 6 is made available to the PID controller 5. The PID controller 5 sets the engine torque 7 as a function of the filtered actual slip 4 and the target slip 6. Alternatively, it is conceivable, instead of adaptively filtering the actual slip 4 as a function of the wheel load fluctuations, to vary the amplification of the PID controller 5 adaptively as a function of the wheel load fluctuations.

The present invention can also be applied in an analogous fashion to an anti-lock brake method.

LIST OF REFERENCE NUMBERS

1 Traction control system
2a Calculated actual slip
2b Wheel load fluctuation
2c Vertical acceleration
2d Roll rate
3 Adaptive filter
4 Filtered actual slip
5 PID controller 6 Target slip
7 Engine torque

What is claimed is:

1. A traction control method for a vehicle, comprising:
determining an actual slip of a wheel of the vehicle,
adaptively determining a filtered actual slip from the actual slip using an adaptive filter,
transmitting the filtered actual slip to a controller,
setting an engine torque using the controller as a function of the filtered actual slip and target slip, and
providing a wheel load fluctuation to the adaptive filter, and determining the filtered actual slip of at least one wheel of the vehicle using the adaptive filter as a function of the wheel load fluctuation of the same wheel of the vehicle.

2. The traction control method as claimed in claim 1, further comprising providing a vertical acceleration to the adaptive filter in order to determine the wheel load fluctuation, and determining the filtered actual slip of at least one wheel of the vehicle using the adaptive filter as a function of the vertical acceleration of the same wheel of the vehicle.

3. The traction control method as claimed in claim 1, further comprising providing a roll rate of a vehicle wheel to the adaptive filter in order to determine the wheel load fluctuation, and determining the filtered actual slip of at least one wheel of the vehicle using the adaptive filter as a function of the roll rate on the same wheel of the vehicle.

4. A traction control device for a vehicle, comprising:
an adaptive filter that is configured to adaptively determine a filtered actual slip from an actual slip of a wheel of the vehicle, and the adaptive filter has an input for the actual slip and an output for the filtered actual slip; and
a controller that is configured to receive the filtered actual slip and set an engine torque as a function of the filtered actual slip and a target slip, and the controller has an input for the filtered actual slip, an input for the target slip, and an output for regulating the engine torque,
wherein the adaptive filter has an input for a wheel load fluctuation of at least one wheel of the vehicle.

5. The traction control device as claimed in claim 4, wherein the adaptive filter has an input for a vertical acceleration of at least one wheel of the vehicle.

6. The traction control device as claimed in claim 5, wherein the adaptive filter has an input for a roll rate of at least one wheel of the vehicle.

* * * * *